(12) United States Patent
Fujishiro et al.

(10) Patent No.: US 11,457,055 B2
(45) Date of Patent: Sep. 27, 2022

(54) METHOD FOR PERFORMING CODEC ADAPTATION IN A UE OPERATING IN A COMMUNICATION NETWORK

(71) Applicant: KYOCERA Corporation, Kyoto (JP)

(72) Inventors: Masato Fujishiro, Yokohama (JP); Henry Chang, San Diego, CA (US); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/167,745

(22) Filed: Feb. 4, 2021

(65) Prior Publication Data

US 2021/0168188 A1 Jun. 3, 2021

Related U.S. Application Data

(63) Continuation of application No. 16/145,615, filed on Sep. 28, 2018, now Pat. No. 10,931,729, which is a
(Continued)

(51) Int. Cl.
*H04W 4/00* (2018.01)
*H04L 65/70* (2022.01)
(Continued)

(52) U.S. Cl.
CPC ............ *H04L 65/70* (2022.05); *H04L 1/0003* (2013.01); *H04L 1/0009* (2013.01); *H04L 65/10* (2013.01);
(Continued)

(58) Field of Classification Search
CPC ..... H04W 76/27; H04W 76/10; H04W 24/10; H04W 28/22; H04W 80/02; H04W 80/08;
(Continued)

(56) References Cited

U.S. PATENT DOCUMENTS 9,648,395 B1 * 5/2017 Henry ............ H04N 21/234345
2004/0097240 A1 5/2004 Chen et al.
(Continued)

FOREIGN PATENT DOCUMENTS

CA 2804157 A1 1/2012
JP 2003244063 A 8/2003
(Continued)

OTHER PUBLICATIONS

Huawei, HiSilicon; "Motivation for a New Si: RAN optimization for EVS full HD voice in LTE"; 3GPP TSG RAN Meeting #70; RP-151898; Dec. 7-10, 2015; Sitges, Spain.
(Continued)

*Primary Examiner* — Abdelnabi O Musa
(74) *Attorney, Agent, or Firm* — Studebaker & Brackett PC

(57) ABSTRACT

A method, user equipment and chipset is used for a first user equipment (UE) having a codec in which at least one of encoding audio or video data and decoding of the audio or video data is performed. A first bit rate is acquired for the codec from a second user equipment that is a communication partner of the first user equipment, a base station a message is transmitted to a base station for checking whether the first bit rate can be provided by a base station. The message includes information indicating the first bit rate.

3 Claims, 11 Drawing Sheets

Related U.S. Application Data continuation of application No. PCT/JP2017/011811, filed on Mar. 23, 2017.

(60) Provisional application No. 62/335,835, filed on May 13, 2016, provisional application No. 62/315,843, filed on Mar. 31, 2016.

(51) Int. Cl.

| | | |
|---|---|---|
| *H04W 76/10* | (2018.01) | |
| *H04W 28/22* | (2009.01) | |
| *H04L 1/00* | (2006.01) | |
| *H04L 65/10* | (2022.01) | |
| *H04W 76/27* | (2018.01) | |
| *H04W 24/10* | (2009.01) | |
| *H04W 74/08* | (2009.01) | |
| *H04L 1/18* | (2006.01) | |
| *H04W 80/02* | (2009.01) | |
| *H04W 80/08* | (2009.01) | |

(52) U.S. Cl.
CPC ........... *H04W 24/10* (2013.01); *H04W 28/22* (2013.01); *H04W 74/0833* (2013.01); *H04W 76/10* (2018.02); *H04W 76/27* (2018.02); *H04L 1/18* (2013.01); *H04W 80/02* (2013.01); *H04W 80/08* (2013.01)

(58) Field of Classification Search
CPC ....... H04L 1/003; H04L 1/0009; H04L 65/10; H04L 1/18
See application file for complete search history.

(56) References Cited

U.S. PATENT DOCUMENTS

| | | | |
|---|---|---|---|
| 2004/0131021 A1 | 7/2004 | Kanemoto et al. | |
| 2008/0049813 A1 | 2/2008 | Kurose et al. | |
| 2008/0268852 A1 | 10/2008 | Petrovic et al. | |
| 2010/0167736 A1 | 7/2010 | Kobayashi | |
| 2010/0271988 A1 | 10/2010 | Jia et al. | |
| 2010/0279701 A1* | 11/2010 | Chen ..................... | H04L 1/20 455/452.2 |
| 2010/0309788 A1 | 12/2010 | Ho et al. | |
| 2012/0224548 A1 | 9/2012 | Marinier et al. | |
| 2014/0036685 A1 | 2/2014 | Kim et al. | |
| 2014/0072035 A1* | 3/2014 | Rabii ..................... | H04N 5/147 375/240.03 |
| 2014/0207907 A1 | 7/2014 | Wang et al. | |
| 2015/0156766 A1* | 6/2015 | Xu ..................... | H04W 72/0413 370/252 |
| 2016/0119384 A1* | 4/2016 | Karimli ............... | H04L 65/1083 370/252 |
| 2016/0381691 A1* | 12/2016 | Panchai ................ | H04L 1/0002 370/329 |
| 2017/0026982 A1* | 1/2017 | Koskinen .............. | H04W 72/12 |
| 2017/0099587 A1* | 4/2017 | Patel ...................... | H04W 4/02 |
| 2017/0164238 A1* | 6/2017 | Paredes Cabrera ..... | H04L 69/22 |

FOREIGN PATENT DOCUMENTS

| | | |
|---|---|---|
| JP | 2004172907 A | 6/2004 |
| JP | 2007531430 A | 11/2007 |
| JP | 2008054125 A | 3/2008 |
| JP | 2013534784 A | 9/2013 |
| WO | 2007097145 A1 | 8/2007 |
| WO | 2016001715 A1 | 1/2016 |

OTHER PUBLICATIONS

Intel Corporation; "Considerations on the scope of the VoLTE enhancements study"; 3GPP TSG-RAN WG2 Meeting #93bis; R2-162473; Apr. 11-15, 2016; Dubrovnik, Croatia.

Huawei, HiSilicon; "RAN based codec adaptation mechanism"; 3GPP TSG-RAN WG2 Meeting #93bis; R2-162647; Apr. 11-15, 2016, Dubrovnik, Croatia.

Vice-Chairman (CMCC); "Report from LTE Break-Out session (eVoLTE, Light conn, Mobility enh)"; 3GPP TSG RAN WG2 #93bis; R2-163057; Apr. 11-15, 2016; Dubrovnik, Croatia.

Ericsson LM; "Considerations on EVS for 3GPP CS systems"; 3GPP TSG SA4 EVS SWG Call; Tdoc : AHEVS-381; Jun. 17, 2015; total 6 pages.

Huawei; "Considerations on Rate Control for VoIP"; 3GPP TSG-RAN-WG2 Meeting #56bis; R2-070157; Jan. 15-19, 2007; total 4 pages; Sorrento, Italy.

* cited by examiner

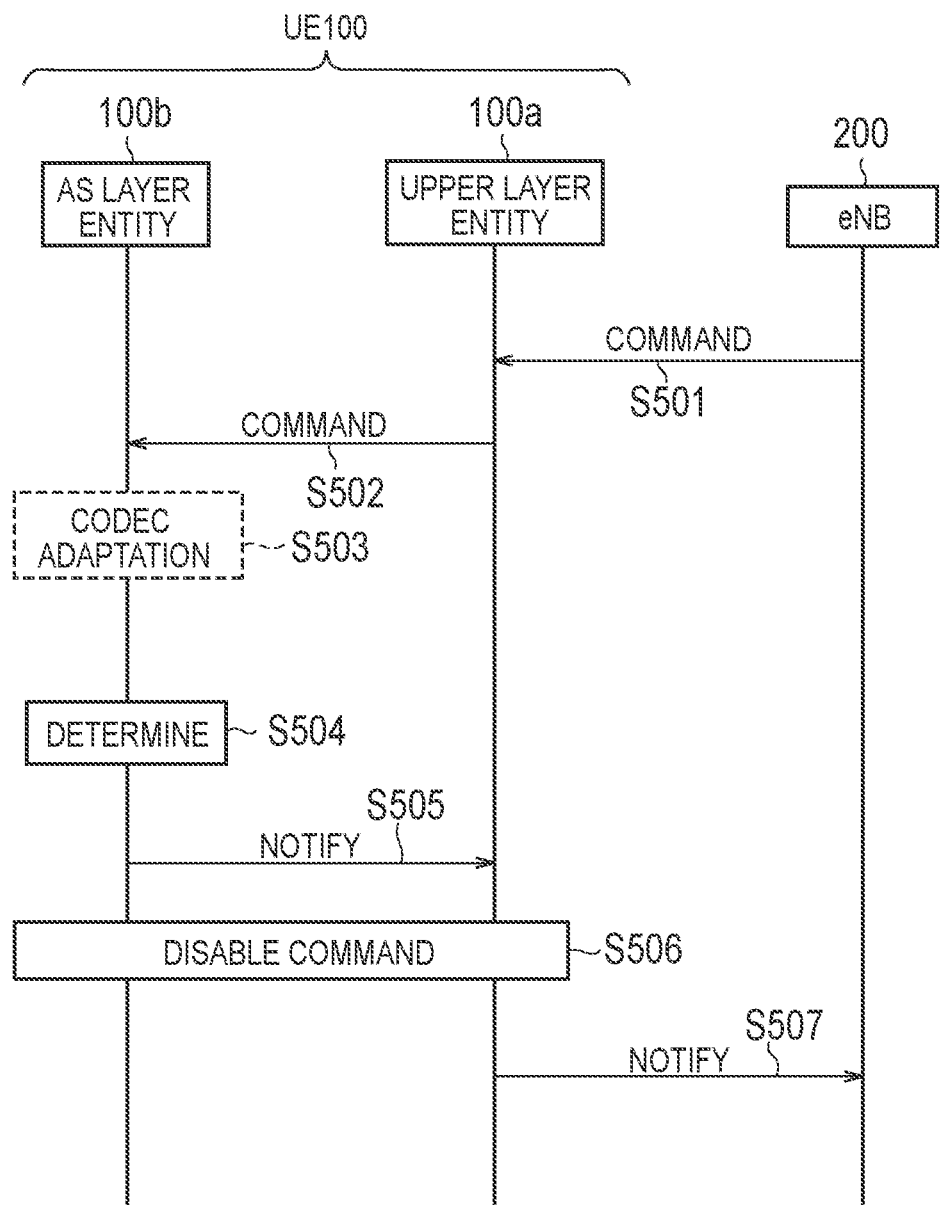

METHOD FOR PERFORMING CODEC ADAPTATION IN A UE OPERATING IN A COMMUNICATION NETWORK

CROSS-REFERENCE TO RELATED APPLICATION

This application is a Continuation Application of U.S. patent application Ser. No. 16/145,615 filed Sep. 28, 2018, which is a continuation based on PCT Application No. PCT/JP2017/011811 filed on Mar. 23, 2017, which claims the benefit of U.S. Provisional Application No. 62/315,843 filed on Mar. 31, 2016 and the U.S. Provisional Application No. 62/335,835 filed on May 13, 2016. The content of which are incorporated by reference herein in their entirety.

FIELD

The present disclosure relates to a radio terminal and a base station used in a mobile communication system.

BACKGROUND

In mobile communication systems, voice communication techniques using IP (Internet Protocol) packets are put in practical use. A radio terminal transmits and receives IP packets containing voice data to and from a communication partner via RAN (Radio Access Network). The RAN includes a base station. The communication partner of the radio terminal includes another radio terminal, a server, or the like.

The radio terminal includes a codec for coding and decoding the voice data. The codec may also be used for coding and decoding video data. The radio terminal performs a codec adaptation through a negotiation with the communication partner. The negotiation is performed by using, for example, a SIP (Session Initiation Protocol).

Codec adaptation is a technique of adapting a codec mode and/or a codec rate. The codec mode is, for example, AMR (Adaptive Multi-Rate), and EVS (Enhanced Voice Services). The codec rate is also referred to as the coding rate or the bit rate.

Through the active participation of the RAN (the base station) in such a codec adaptation, the voice/video quality could be improved.

SUMMARY

A method according to the present disclosure is used for a first user equipment (UE) having a codec in which at least one of encoding audio or video data and decoding of the audio or video data is performed. The method comprises acquiring a first bit rate for the codec from a second user equipment that is a communication partner of the first user equipment, and transmitting to a base station a message for checking whether the first bit rate can be provided by the base station. The message includes information indicating the first bit rate.

A first user equipment (UE) according to the present disclosure has a codec in which at least one of encoding audio or video data and decoding of the audio or video data is performed, and comprises a memory and a processor electrically connected to the memory. The processor is configured to execute processes of acquiring a first bit rate for the codec from a second user equipment that is a communication partner of the first user equipment, and transmitting to a base station, a message for checking whether the first bit rate can be provided by the base station. The message includes information indicating the first bit rate.

A chipset for a first user equipment (UE) according to the present disclosure has a codec in which at least one of encoding audio or video data and decoding of the audio or video data is performed, and comprises a memory and a processor electrically connected to the memory. The processor is configured to execute processes of acquiring a first bit rate for the codec from a second user equipment that is a communication partner of the first user equipment, and transmitting to a base station a message for checking whether the first bit rate can be provided by the base station. The message includes information indicating the first bit rate.

BRIEF DESCRIPTION OF THE DRAWINGS

FIG. 13 is a diagram illustrating an example of an operation sequence according to a fifth embodiment.

DESCRIPTION OF THE EMBODIMENT (Configuration of Mobile Communication System)

Figure 1:
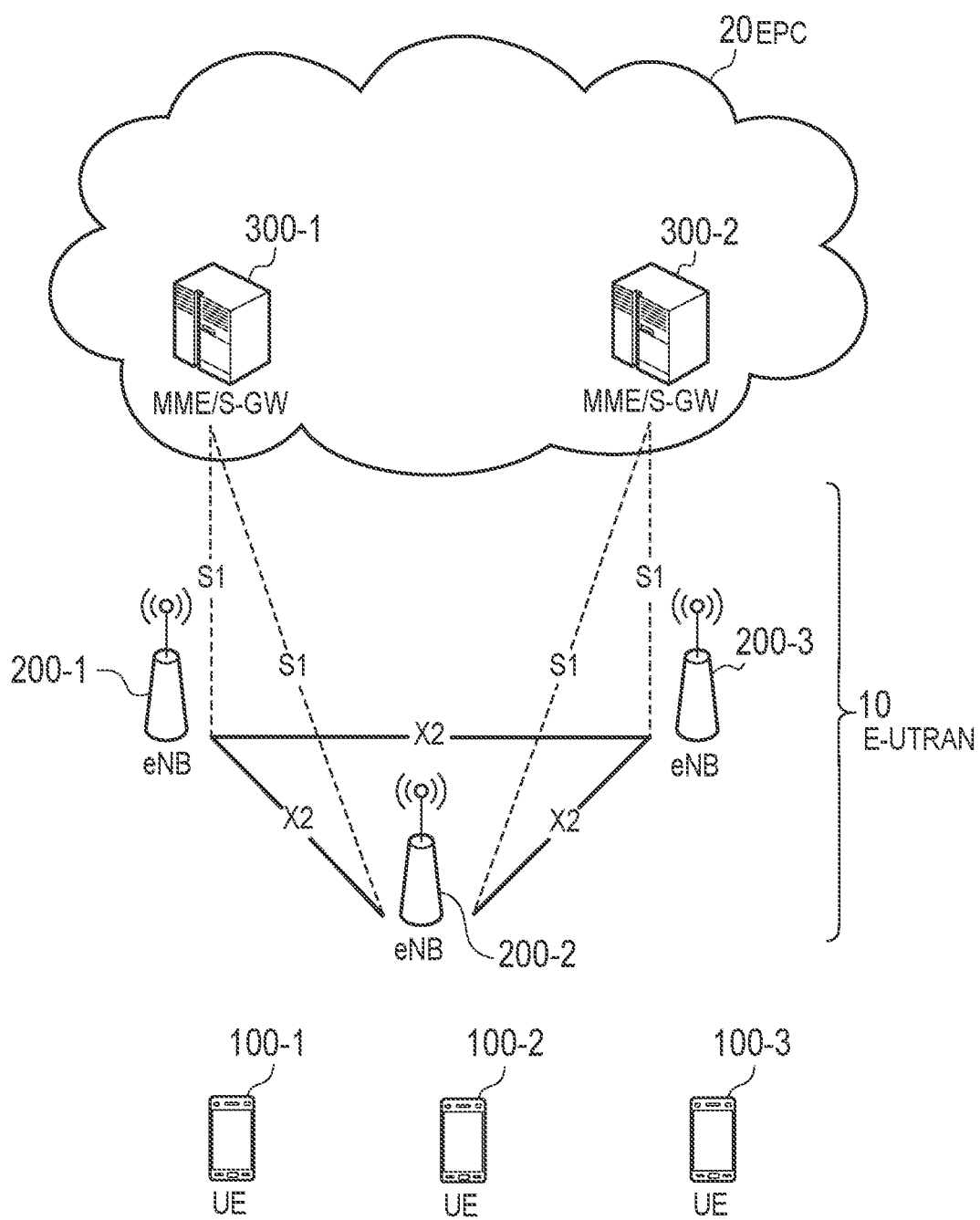
FIG. 1 is a diagram illustrating a configuration of an LTE system.

Hereinafter, the configuration of the mobile communication system according to the embodiment will be described. FIG. 1 is a diagram showing a configuration of an LTE (Long Term Evolution) system which is a mobile communication system according to the embodiment. The LTE system is a mobile communication system based on the 3rd Generation Partnership Project (3GPP) standard.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/ S-GWs (Serving-Gateways) 300. The MME performs various mobility controls and the like for the UE 100. The S-GW performs control to transfer data. MME/S-GW 300 is connected to eNB 200 via an S1 interface.

(Configuration of Radio Terminal)

Figure 2:
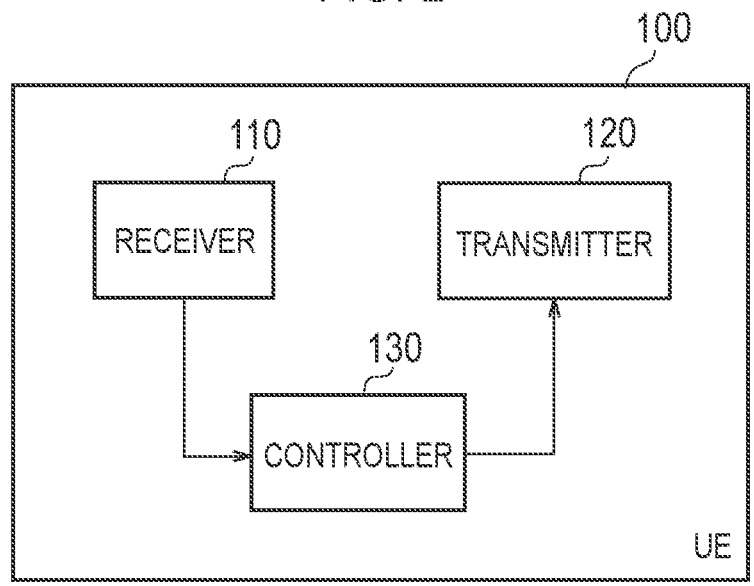
FIG. 2 is a diagram illustrating a configuration of a UE (a radio terminal).

FIG. 2 is a diagram of the configuration of UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may further include a codec that performs encoding and decoding on sound and video data. The processor executes below-described processes.

Figure 3:
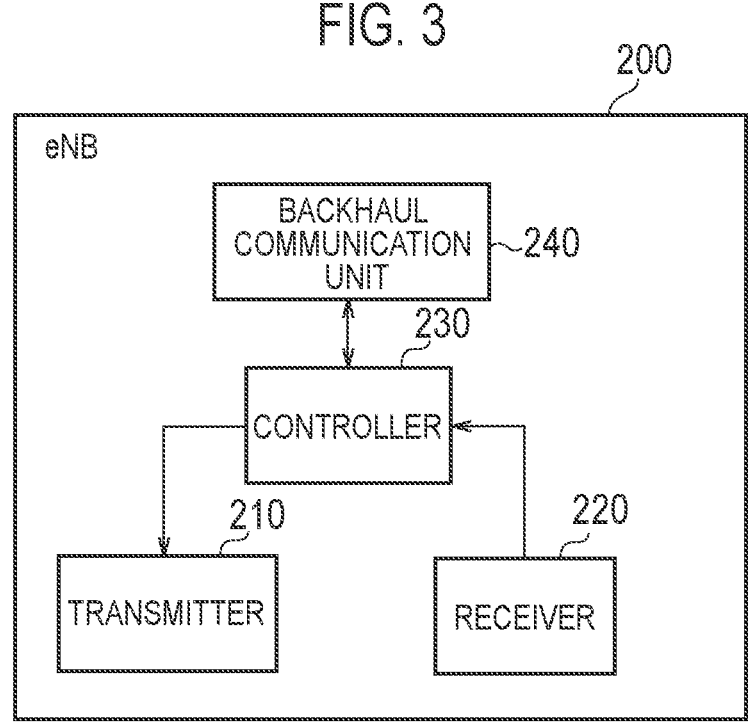
FIG. 3 is a diagram illustrating a configuration of an eNB (a base station).

FIG. 3 is a diagram illustrating configuration of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

Figure 4:
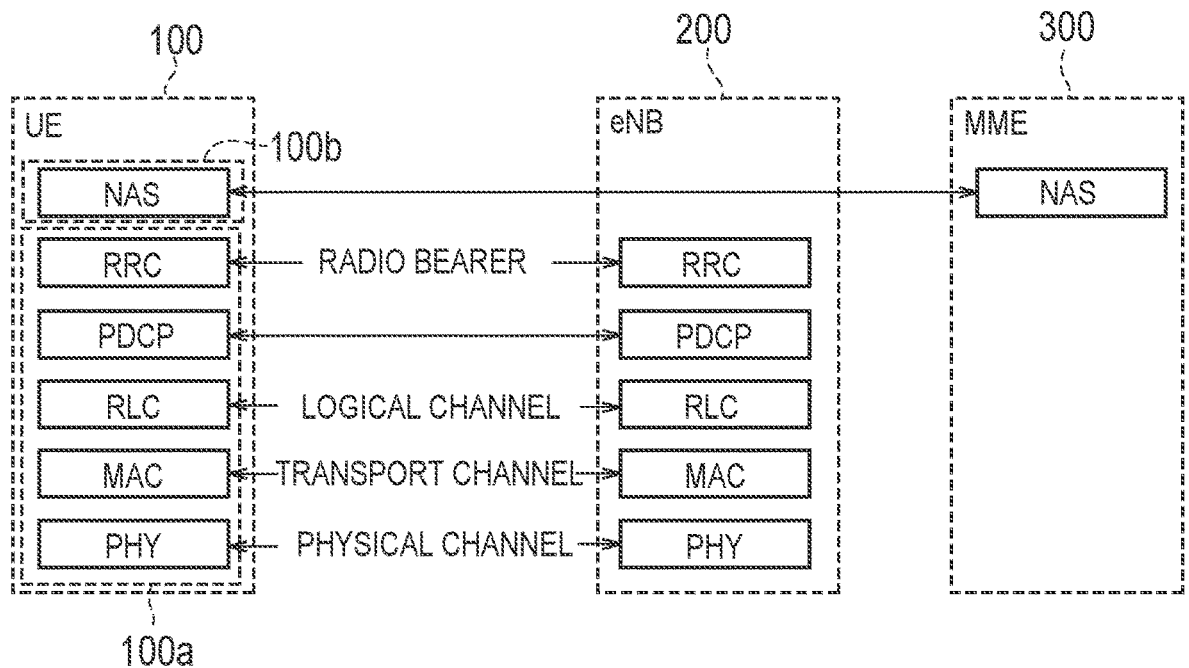
FIG. 4 is a diagram illustrating a configuration of a protocol stack of a radio interface in the LTE system.

FIG. 4 is a diagram illustrating protocol stack of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The physical layer, the MAC layer, the RLC layer, the PDCP layer, and the RRC layer constitute an AS (Access Stratum) layer entity 100a. The upper layer entity 100b is positioned higher than the AS layer entity 100a. The upper layer entity 100b includes an NAS (Non-Access Stratum) layer. The upper layer entity 100b may further include an application layer or the like. The upper layer entity 100b executes codec adaptation described later.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 5:
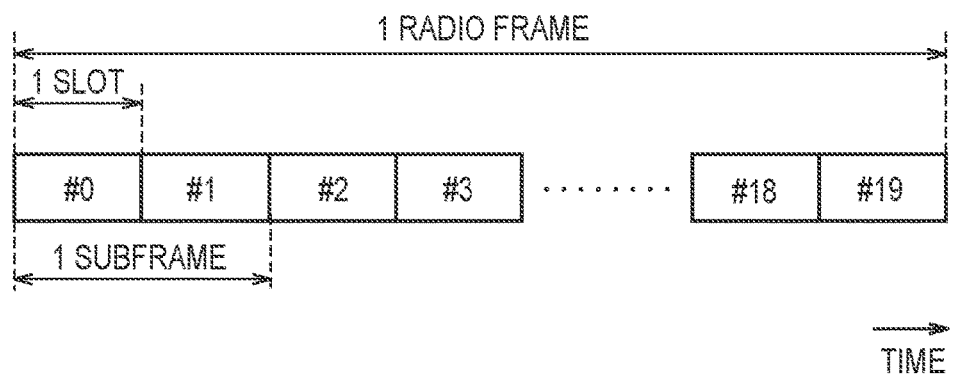
FIG. 5 is a diagram illustrating a configuration of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information. Furthermore, the other portion of each subframe is a region available as a physical downlink shared channel (PDSCH) for mainly transmitting downlink data.

In general, the eNB 200 uses the PDCCH to transmit downlink control information (DCI) to the UE 100, and uses the PDSCH to transmit the downlink data to the UE 100. The downlink control information carried by the PDCCH includes uplink scheduling information, downlink scheduling information, and a TPC command. The uplink scheduling information is scheduling information related to an allocation of an uplink radio resource (UL grant), and the downlink scheduling information is scheduling information related to an allocation of a downlink radio resource. The TPC command is information for instructing an increase or decrease in the uplink transmission power. In order to identify a UE 100 to which the downlink control information is transmitted, the eNB 200 includes, into the downlink control information, a CRC bit scrambled by an identifier (RNTI: Radio Network Temporary ID) of the UE 100 to which the downlink control information is transmitted. Each UE 100, for the downlink control information that may be addressed to the UE 100, after descrambling the RNTI of the UE 100, checks CRC so as to perform blind decoding of the PDCCH to detect the downlink control information addressed to the UE 100. The PDSCH carries the downlink data by the downlink radio resource (resource block) indicated by the downlink scheduling information.

In the uplink, both ends in the frequency direction of each subframe are control regions used as a physical uplink control channel (PUCCH) for mainly transmitting an uplink control information. Furthermore, the other portion of each subframe is a region available as a physical uplink shared channel (PUSCH) for mainly transmitting uplink data.

In general, the UE 100 uses the PUCCH to transmit uplink control information (UCI) to the eNB 200, and uses the PUSCH to transmit the uplink data to the eNB 200. The uplink control information carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) available for the downlink transmission. The SR is information for requesting an allocation of a PUSCH resource. The HARQ ACK/NACK is delivery acknowledgment information indicating whether or not the downlink data is correctly received.

First Embodiment

A first embodiment will be described below

A UE 100 according to the first embodiment is configured to perform a codec adaptation based on assistance or control by an eNB 200. The codec adaptation based on the assistance by the eNB 200 may be referred to as an "eNB-assisted Codec Adaptation". The codec adaptation based on the control by the eNB 200 may be referred to as an "eNB-controlled Codec Adaptation". The "eNB-assisted Codec Adaptation" is a method in which the UE 100 decides a codec mode and/or a codec rate, and the eNB 200 provides, to the UE 100, auxiliary information for the decision. In contrast, the "eNB-controlled Codec Adaptation" is a method in which the eNB 200 decides a codec mode and/or a codec rate, and the codec mode and/or the code rate is specified by the eNB 200 to the UE 100.

In the first embodiment, a scenario in which the UE 100, to perform voice communication (VoLTE: Voice over LTE) by using an IP packet, establishes a connection with the eNB 200 is assumed.

An RRC connected mode and an RRC idle mode are considered as an initial state of the UE 100 during the setup of a call.

The UE 100 in the RRC connected mode, for example, performs a call setup for establishing an additional bearer (DRB: Data Radio Bearer) for the VoLTE. The eNB 200 can acquire a radio quality parameter of the UE 100 in the RRC connected mode through a measurement report and/or a CSI (Channel State Information) report. Thus, the eNB 200 may, in consideration of the radio quality of the UE 100, decide the appropriate codec mode and/or codec rate for the additional bearer.

To perform a call setup, the UE 100 in the RRC idle mode is required to transit to the RRC connected mode after establishing an RRC connection with the eNB 200. That is, the UE 100 is required to perform a random access procedure. The eNB 200 can not acquire the radio quality parameter of the UE 100 in the RRC idle mode. Therefore, there is a problem that unless the random access procedure has been completed, and the eNB 200 has received a measurement report and/or a CSI report from the UE 100, the eNB 200 cannot decide an appropriate codec mode and/or codec rate. The first embodiment is an embodiment by which such a problem can be solved.

(1) Radio Terminal According to First Embodiment

In the first embodiment, the UE 100 (radio terminal) measures a radio quality parameter of the downlink. The UE 100, in a procedure for establishing a connection with the eNB 200 (that is, a random access procedure), transmits a predetermined message including the radio quality parameter to the eNB 200. In the first embodiment, the predetermined message is an RRC Connection Setup Complete message. The RRC Connection Setup Complete message is called "Msg 5".

Examples of the message that the UE 100 transmits to the eNB 200 in the random access procedure include three messages, namely a random access preamble (Msg 1), an RRC Connection Request message (Msg 3), and an RRC Connection Setup Complete message (Msg 5). The radio quality parameter may be included in the Msg 1 or the Msg 3, but the message size of the Msg 1 or the Msg 3 is restricted. Therefore, the radio quality parameter is preferably included in the Msg 5.

Thus, according to the first embodiment, the eNB 200 can understand the radio quality of the UE 100 during the random access procedure. Accordingly, the eNB 200 can decide the appropriate codec mode and/or codec rate at an earlier stage.

It is noted that the radio quality parameter measured by the UE 100 is preferably a parameter indicating the quality of a radio signal received from at least a serving cell. A measurement report stipulated according to the specifications of an RRC layer, or a CSI report stipulated according to the specifications of a physical layer can be used as the radio quality parameter. Examples of the radio quality parameter include RSRP (Reference Signal Received Power), RSRQ (Reference Signal Received Quality), RS-SINR (Reference Signal-Signal-to-Interference plus Noise power Ratio), CQI (Channel Quality Indicator), PMI (Precoding Matrix Indicator), and an RI (Rank Indicator). The RSRP, RSRQ, and RS-SINR are radio quality parameters for the measurement report. The CQI, PMI, and RI are radio quality parameters for the CSI report. Alternatively, a reporting method using a new radio report table may also be used in addition to the reporting methods described above. The radio report table, for example, may be defined to reduce the report size when the message size is restricted, such as in the case of the Msg 1 or the Msg 3. In this case, for example, for the RSRP value, the resolution may reduce, and mapping may be irregular. Specifically, as an example of mapping to four values, 0 may be below −90 dBm, 1 may be −90 dBm or more to below −85 dBm, 2 may be −85 dBm or more to below −70 dBm, and 4 may be −70 dBm or more, or the like.

It is necessary for the eNB 200 to understand how the UE 100 measured the radio quality parameter. For example, since CQI includes two types, namely wide-band CQI and sub-band CQI, it is difficult for the eNB 200 to identify the type of the CQI received from the UE 100. Therefore, the UE 100 measures the radio quality parameter according to first measurement configuration information or second measurement configuration information. The measurement configuration information may include information for specifying the type of the radio quality parameter that the UE 100 is required to measure.

The first measurement configuration information is information that is set from the eNB 200 by broadcast. For example, a broadcast using SIB (System information Block), PDCCH (DCI) or PDSCH (paging channel), or MCCH (Multicast Control Channel) can be utilized. The MCCH may be an SC (Single Cell)-MCCH. SIB, PDCCH, or (MC-) MCCH will be used for transmission by broadcast below. Such broadcast information is information that a UE 100 in an RRC idle mode can receive, and the UE 100 can acquire the first measurement configuration information before starting the random access procedure. It is noted that the first measurement configuration information may include information for specifying a cell or a frequency that the UE 100 should measure.

The second measurement configuration information is information previously set in the UE 100. For example, in the second measurement configuration information, a stipulated value is specified base on the specification.

The UE 100 (the controller 130) includes an RRC layer entity and a physical layer entity. The measurement of the radio quality parameter is performed by the physical layer entity. In contrast, an RRC Connection Setup Complete message (Msg 5) is an RRC message that is transmitted by the RRC layer entity. Therefore, an exchange is necessary between the physical layer and the RRC layer. Firstly, in response to the establishment of a connection with the eNB 200, the RRC layer entity notifies the physical layer entity of the information for causing the physical layer entity to measure the radio quality parameter. For example, the RRC layer entity, upon recognizing a necessity of a call setup (for example, a DRB establishment for VoLTE), or when transmitting a random access preamble (Msg 1), notifies the physical layer entity. The information for causing the physical layer entity to measure the radio quality parameter may be information for requesting the measurement of the radio quality parameter, or may be information for notifying the availability of a VoLTE call setup. At this time, the RRC layer entity may provide the first measurement configuration information or the second measurement configuration information described above to the physical layer entity. Next, before transmitting the RRC Connection Setup Complete message (Msg 5), the RRC layer entity acquires the radio quality parameter from the physical layer entity.

Further, before transmitting the RRC Connection Setup Complete message (Msg 5), the RRC layer entity performs filtering (that is, smoothing) of the radio quality parameter, based on filtering configuration information. Such filtering is referred to as L3 filtering. The filtering configuration information includes various parameters related to L3 filtering. Such parameters include, for example, a period during which the radio quality parameter for which the L3 filtering is to be performed is stored. The filtering configuration information may be set from the eNB 200 by broadcast, similarly to the first measurement configuration information described above. In this case, the filtering configuration information may be included in the first measurement configuration information described above. Alternatively, the filtering configuration information may be previously set in the UE 100, similarly to the second measurement configuration information described above.

The UE 100 may, either before the random access procedure, or during the random access procedure, receive from the eNB 200, an indication indicating that the eNB 200 has a function of assisting or controlling a codec adaptation (that is, the eNB 200 supports a codec adaptation). The indication may be an explicit indication indicating that the eNB 200 supports the codec adaptation. The explicit indication is transmitted from the eNB 200 by broadcast. Alternatively, the explicit indication may be included in the RRC Connection Setup message (Msg 4) received from the eNB 200 during the random access procedure. Alternatively, the first measurement configuration information or the filtering configuration information described above may be used as an implicit indication. In response to the receipt of an indication, the UE 100 decides to include the radio quality parameter in the RRC Connection Setup Complete message. In other words, if a call is set up via an eNB 200 (a serving cell) that does not transmit an indication, the UE 100 does not include the radio quality parameter into the RRC Connection Setup Complete message (Msg 5).

The UE 100, after transmitting the RRC Connection Setup Complete message (Msg 5), receives from the eNB 200, the RRC Connection Reconfiguration message for establishing a DRB. In the case of "eNB-assisted Codec Adaptation", the RRC Connection Reconfiguration message includes information indicating a minimum guaranteed bit rate. The minimum guaranteed bit rate may be a recommended bit rate (same hereinafter). The UE 100 performs the codec adaptation by using information indicating the minimum guaranteed bit rate. In contrast, in the case of "eNB-controlled Codec Adaptation", the RRC Connection Reconfiguration message includes information indicating the code mode and/or the codec rate. The UE 100 performs the codec adaptation by using information indicating the codec mode and/or the codec rate.

(2) Base Station

The eNB 200 (the base station) according to the first embodiment is configured to assist or control the codec adaptation of the UE 100. The eNB 200, in a (a random access procedure) procedure for establishing a connection with the UE 100, receives a predetermined message (Msg 5) including a radio quality parameter of the downlink, from the UE 100. The eNB 200, based on the radio quality parameter, understands the radio quality of the UE 100 in the random access procedure.

In the case of the "eNB-assisted Codec Adaptation", the eNB 200, based on the radio quality parameter, decides an MCS and a radio resource amount that can be guaranteed at the very least (for example, the settings of semi-persistent scheduling). From this information, the eNB 200 can determine the minimum guaranteed bit rate. The eNB 200 transmits, to the UE 100, an RRC Connection Reconfiguration message including information indicating the minimum guaranteed bit rate. The information indicating the minimum guaranteed bit rate may be an index of the minimum guaranteed bit rate.

In the case of the "eNB-controlled Codec Adaptation", the eNB 200 acquires radio capability information of the UE 100 from the MME 300, and decides the appropriate codec mode and/or the codec rate in consideration of the capability of the UE 100 as well. The radio capability information of the UE 100 includes information about the codec mode supported by the UE 100, and also information about whether or not the UE 100 supports the codec adaptation. For example, the eNB 200 receives an Initial Context Setup Request including the radio capability information of the UE 100, via an S1 interface. The eNB 200 transmits, to the UE 100, an RRC Connection Reconfiguration message including information indicating the codec mode and/or the codec rate.

Further, the eNB 200 transmits at least one of the first measurement configuration information, the filtering configuration information, and the indication described above.

(3) Operation Sequence Example

Figure 6:
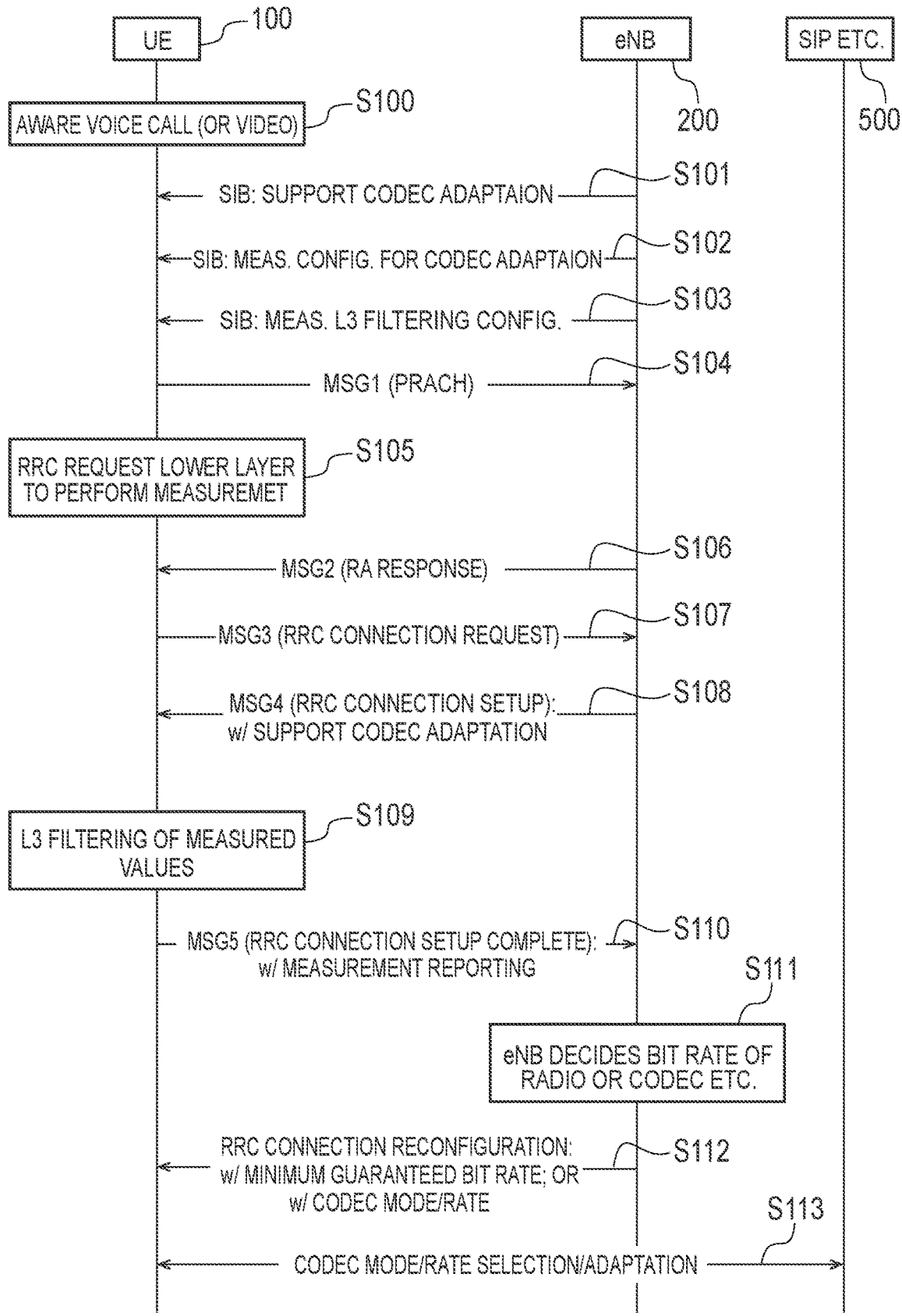
FIG. 6 is a diagram illustrating an example of an operation sequence according to a first embodiment.

FIG. 6 is a diagram illustrating an operation sequence according to the first embodiment. In the example illustrated in FIG. 6, a communication partner 500 of the UE 100 is an entity using an SIP or the like. In the example illustrated in FIG. 6, the initial state of the UE 100 is in the RRC idle mode. It is noted that some of steps illustrated in FIG. 6 may be omitted.

As illustrated in FIG. 6, in step S100, the UE 100 determines to perform a call setup.

In step S101, the eNB 200 transmits, through SIB, an indication (Support Codec Adaptation) indicating that the eNB 200 supports the codec adaptation. In response to receipt of the indication, the UE 100 determines that the eNB 200 supports the codec adaptation.

In step S102, the eNB 200 transmits the first measurement configuration information (Meas. Config) through SIB. The UE 100 stores the first measurement configuration information received from the eNB 200.

In step S103, the eNB 200 transmits the filtering configuration information (L3 filtering config.) through SIB. The UE 100 stores the filtering configuration information received from the eNB 200.

In step S104, the UE 100 transmits, to the eNB 200, the random access preamble (Msg 1) on a physical random access channel (PRACH). The eNB 200 receives the random access preamble (Msg 1). It is noted that the eNB 200, based on the random access preamble received from the UE 100, estimates an uplink delay between the eNB 200 and the UE 100.

In step S105, in response to the transmission of the random access preamble (Msg 1), the RRC layer entity of the UE 100 requests the physical layer entity to measure the radio quality parameter. The physical layer entity of the UE 100 starts measuring the radio quality parameter.

In step S106, the eNB 200 transmits, to the UE 100, a random access response (RA Response) on a downlink shared channel (DL-SCH). The random access response (Msg 2) is a type of MAC control element (MAC CE), and is called Msg 2. The random access response (Msg 2) includes a timing advance value (TA: Timing Advance) that is a timing correction value based on a result of a delay estimation, allocation information of an uplink radio resource (UL grant), a preamble identifier (Preamble ID), and a "Temporary C-RNTI". It is noted that the "Preamble ID" is an ID indicating a signal sequence of the random access preamble received from the UE 100. The UE 100 receives the random access response (Msg 2).

In step S107, the UE 100, based on the random access response (Msg 2), transmits, to the eNB 200, an RRC Connection Request message (Msg 3) on an uplink shared channel (UL-SCH). The eNB 200 receives the RRC Connection Request message (Msg 3).

In step S108, the eNB 200 transmits, to the UE 100, an RRC Connection Setup message (Msg 4) on a downlink shared channel (DL-SCH). The RRC Connection Setup message (Msg 4) may include an indication (Support Codec Adaptation) indicating that the eNB 200 supports the codec adaptation.

In step S109, the RRC layer entity of the UE 100, based on the filtering configuration information, performs L3 filtering of the radio quality parameter acquired from the physical layer entity.

In step S110, the UE 100 transmits, to the eNB 200, an RRC Connection Setup Complete message (Msg 5) on an uplink shared channel (UL-SCH). The RRC Connection Setup Complete message (Msg 5) includes a radio quality parameter report (Measurement reporting) after the L3 filtering.

In step S111, the eNB 200, based on the radio quality parameter report, decides the minimum guaranteed bit rate, or the codec mode and/or the codec rate.

In step S112, the eNB 200 transmits, to the UE 100, an RRC Connection Reconfiguration message on a downlink shared channel (DL-SCH). The RRC Connection Reconfiguration message includes information indicating the minimum guaranteed bit rate, or information indicating the codec mode and/or the codec rate.

In step S113, the UE 100 performs a codec adaptation by using the information included in the RRC Connection Reconfiguration message. For example, an upper layer entity 100b of the UE 100 performs a negotiation with the communication partner 500 by using a SIP, and decides the codec mode and/or the codec rate. Thereafter, the UE 100 performs IP packet communication with the communication partner 500 by using the decided codec mode and/or codec rate.

It is noted that as described earlier, in the messages other than the Msg 5 (the Msg 1 and the Msg 3), a radio quality report may be performed, and in this case, the L3 filtering and the like are appropriately implemented to match the report timing.

Modification of First Embodiment

A modification of the first embodiment will be described while focusing on differences from the first embodiment below.

The UE 100 according to the modification of the first embodiment, in a procedure for establishing a connection with the eNB 200 (random access procedure), transmits a predetermined message to the eNB 200. In the modification of the first embodiment, the predetermined message is an RRC Connection Request message (Msg 3). The RRC Connection Request message (Msg 3) includes information for causing the eNB 200 to execute a negotiation concerning the codec adaptation. The information may be stored in a cause field in the RRC Connection Request message (Msg 3). The cause field is a field in which information indicating a reason for establishment of a connection (establishment cause) is stored. The information for causing the eNB 200 to execute a negotiation concerning the codec adaptation can be considered as "eVoLTE (enhanced VoLTE)", for example. It is noted that instead of the Cause field, any field or identifier may be used.

The eNB 200 performs the negotiation with the communication partner of the UE 100 in response to the reception of the "eVoLTE". The eNB 200, based on the traffic load status of the eNB 200, decides the appropriate codec mode and codec rate through the negotiation. Thereafter, the eNB 200 acquires the radio quality parameter by the RRC Connection Setup Complete message (Msg 5), and may again perform a negotiation based on the radio quality parameter.

Thus, in the modification of the first embodiment, the negotiation with the communication partner of the UE 100 is performed by the eNB 200 instead of the UE 100. Moreover, by utilizing the RRC Connection Request message (Msg 3), it is possible to start the codec adaptation at an earlier stage than that in the first embodiment.

It is noted that instead of the RRC Connection Request message (Msg 3), a random access preamble (Msg 1) may be used. In this case, by using a special PRACH resource or a special signal sequence, the eNB 200 may be requested to perform the negotiation concerning the codec adaptation.

Figure 7:
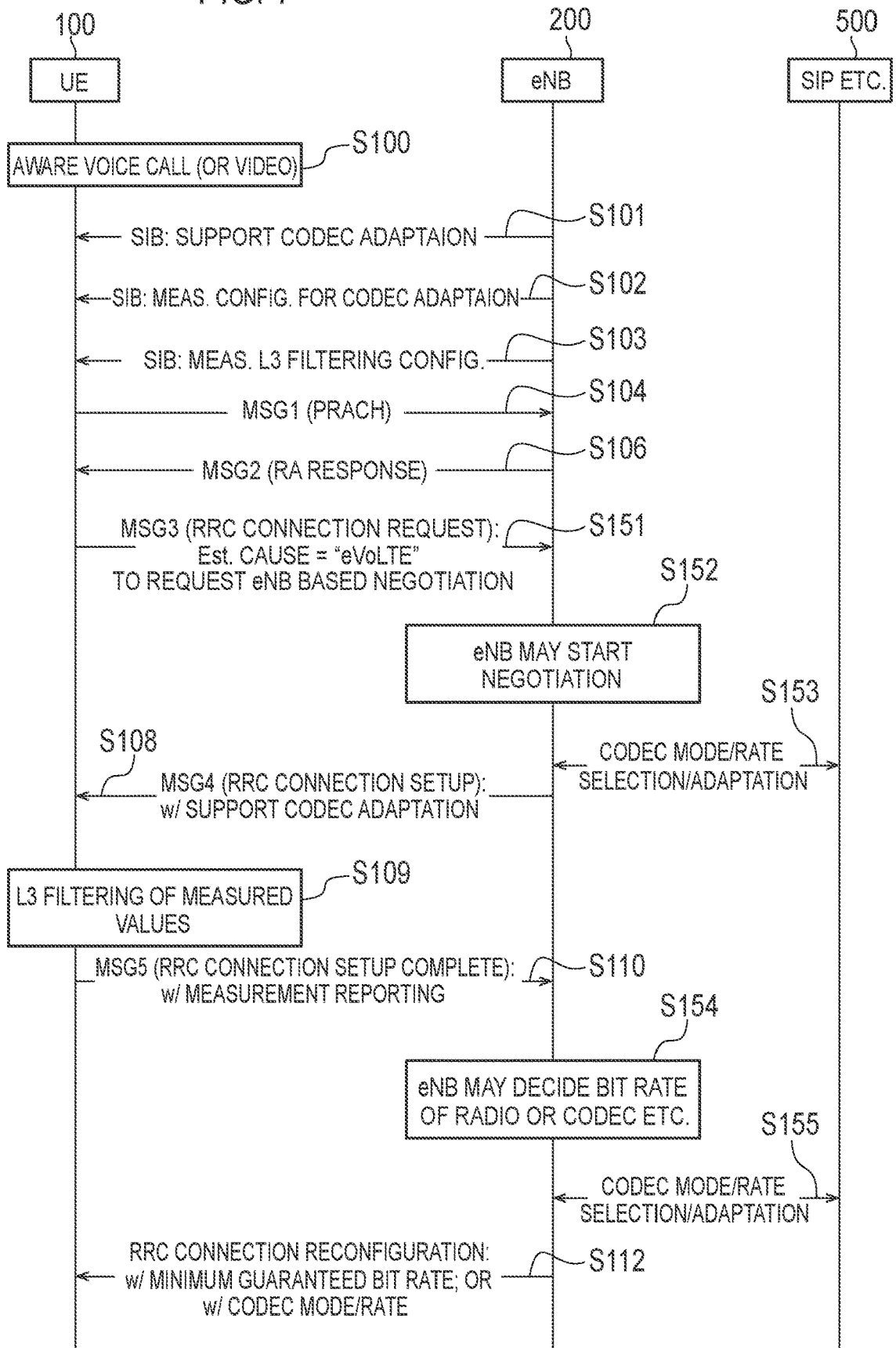
FIG. 7 is a diagram illustrating an example of an operation sequence according to a modification of the first embodiment.

FIG. 7 is a diagram illustrating an example of an operation sequence according to the modification of the first embodiment. Here, differences from the operation sequence illustrated in FIG. 6 are described.

In step S151, the UE 100, based on the random access response (Msg 2), transmits, to the eNB 200, an RRC Connection Request message (Msg 3). The eNB 200 receives the RRC Connection Request message (Msg 3). The RRC Connection Request message (Msg 3) includes "eVoLTE" as information indicating a reason for the establishment of a connection (establishment cause).

In step S152, the eNB 200 starts the negotiation with the communication partner of the UE 100 in response to the reception of the "eVoLTE". The eNB 200 may, based on the traffic load status of the eNB 200, decide the appropriate codec mode and codec rate through the negotiation with the communication partner 500 (step S153).

Thereafter, in step S110, the UE 100 transmits, to the eNB 200, an RRC Connection Setup Complete message (Msg 5). The RRC Connection Setup Complete message (Msg 5) includes the radio quality parameter after the L3 filtering (Measurement reporting).

In step S154, the eNB 200, based on the radio quality parameter, decides the minimum guaranteed bit rate, or the codec mode and/or the codec rate. The eNB 200 may, based on the radio quality parameter, decide the appropriate codec mode and codec rate through the negotiation with the communication partner 500 (step S155).

In step S112, the eNB 200 transmits, to the UE 100, an RRC Connection Reconfiguration message on a downlink shared channel (DL-SCH). The RRC Connection Reconfiguration message includes information indicating the minimum guaranteed bit rate, or information indicating the codec mode and/or the codec rate. It is noted that the negotiation may be implemented between the eNB 200 and the UE 100.

Second Embodiment

A second embodiment will be described while focusing on differences from the first embodiment, below.

In the second embodiment, a scenario in which the UE 100 performs a codec adaptation during voice communication (on-going call) using an IP packet is assumed. In such a scenario, the eNB 200, to properly assist or control the codec adaptation, preferably understands the codec mode and/or the codec rate that the UE 100 has currently applied.

The UE 100 according to the second embodiment includes a UE 100 configured to perform a codec adaptation based on assistance or control by the eNB 200. The UE 100 transmits, to the eNB 200, codec information indicating the codec mode and/or the codec rate of the UE 100. The codec information is transmitted by PUCCH, a MAC CE, an RRC message or the like. The UE 100 transmits codec information in response to a change in the codec mode and/or the codec rate, or an inquiry from the eNB 200. The eNB 200 receives, from the UE 100, the codec information indicating the codec mode and/or the codec rate of the UE 100. The eNB 200 assists or controls the codec adaptation based on the codec information.

Thus, the eNB 200 can appropriately assist or control the codec adaptation. It is noted that the eNB 200 may use the codec information for scheduling of the UE 100. Specifically, the eNB 200 decides the amount of radio resources (for example, the SPS setting) to be allocated to the UE 100 based on the codec information.

In the second embodiment, the UE 100 receives an IP packet from the eNB 200. The eNB 200 includes, into the IP packet (the IP header), non-congestion information indicating that the eNB 200 is not congested. The UE 100 performs the codec adaptation based on the non-congestion information. Specifically, in response to the reception of the non-congestion information, the UE 100 performs the codec adaptation to increase the codec rate. The existing LTE specifications has an ECN (Explicit Congestion Notification) that is a technique by which the eNB 200 includes, into the IP packet (the IP header), congestion information indicating that the eNB 200 is congested. However, according to the existing ECN, only the codec rate can be reduced. In contrast, by including the non-congestion information into an IP packet, it becomes possible to increase the codec rate.

Alternatively, the eNB 200 may transmit, to the UE 100, AS layer signaling for commanding to change the codec mode and/or the codec rate. Examples of the AS layer signaling include PDCCH, a MAC/CE, an RRC message, and the like. Such signaling is different from the ECN, and can also be applied while the UE 100 suspends transmission and reception of an IP packet. The AS layer entity 100*a* of the UE 100 transfers information received through AS layer signaling to the upper layer entity 100*b*. The upper layer entity 100*b* of the UE 100 performs a codec adaptation according to the information transferred from the AS layer entity 100*a*.

Figure 8:
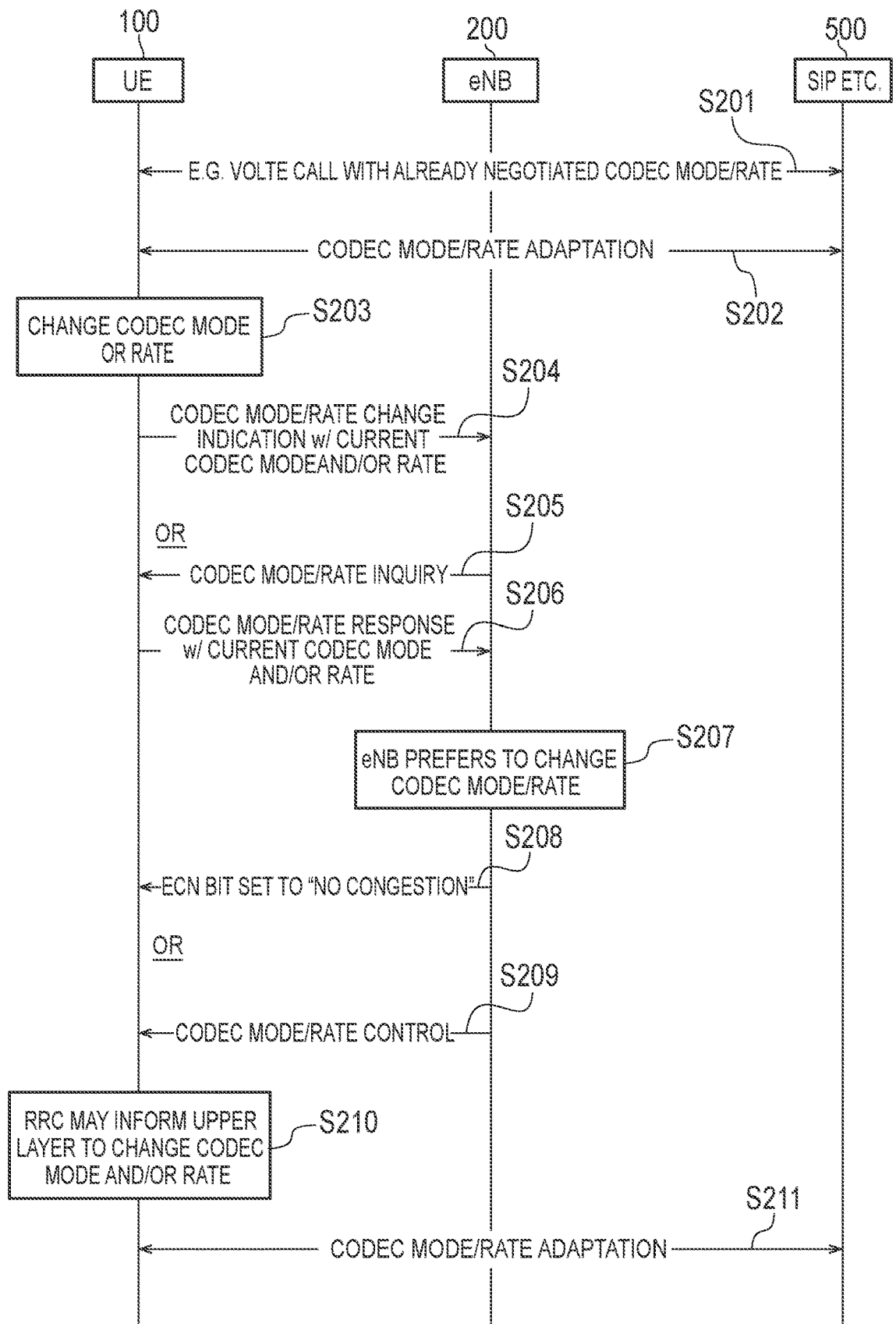
FIG. 8 is a diagram illustrating an example of an operation sequence according to a second embodiment.

FIG. 8 is a diagram illustrating an example of an operation sequence according to the second embodiment. In the example illustrated in FIG. 8, the initial state of the UE 100 is in the RRC connected mode. It is noted that some of steps illustrated in FIG. 8 may be omitted.

As illustrated in FIG. 8, in step S201, the UE 100 performs VoLTE communication (VoLTE call) with the communication partner 500 by the codec mode and/or the codec rate decided through the negotiation with the communication partner 500.

In steps S202 and S203, the UE 100 changes the codec mode and/or the codec rate through the negotiation with the communication partner 500 (codec adaptation).

In step S204, in response to the change in the codec mode and/or the codec rate, the UE 100 transmits, to the eNB 200, codec information indicating the current codec mode and/or codec rate (Codec mode/rate change indication). The UE 100 may transmit the codec information to the eNB 200 whenever changing the codec mode and/or the codec rate. Step S204 may be executed only when a report is set (configured) beforehand by the eNB 200.

Alternatively, instead of step S204, the following methods (steps S205 and S206) may be performed. In step S205, the eNB 200 inquires with the UE 100 about the current codec mode and/or the codec rate. In step S206, in response to the inquiry of the eNB 200, the UE 100 transmits, to the eNB 200, codec information indicating the current codec mode and/or codec rate (Codec mode/rate response).

In step S207, the eNB 200 decides to change the current codec mode and/or codec rate of the UE 100. For example, the eNB 200 determines that it is possible to increase the rate further than the current rate.

In step S208, the eNB 200, if the IP packet received from the communication partner 500 is an ECN-enabled packet (including the extended ECN), sets "no congestion" to ECN bits in the header of the IP packet to transmit the IP packet to the UE 100. In response to reception of the IP packet in which the "no congestion" is set to the header, the UE 100 performs a codec adaptation to increase the codec rate (step S211). It is noted that the extended ECN has another (header) format different from the current ECN format, and supports a non-congestion notification.

Alternatively, instead of step S208, the following methods (steps S209 and S210) may be performed. In step S209, the eNB 200 transmits, to the UE 100, an RRC message (for example, an RRC Connection Reconfiguration message) for commanding to change the codec mode and/or the codec rate. In step S210, the RRC layer entity of the UE 100 transfers a command for changing the codec mode and/or the codec rate to the upper layer entity 100*b*. The upper layer entity 100*b* of the UE 100 performs a codec adaptation according to the change command transferred from the AS layer entity 100*a* (step S211).

Modification of Second Embodiment

A modification of the second embodiment will be described while focusing on differences from the above-described second embodiment below.

In the second embodiment described above, an example in which the AS layer entity 100*a* (the RRC layer entity) of the UE 100 transfers a command for changing the codec mode and/or the codec rate (hereinafter, called a "command") to the upper layer entity 100*b* was described.

However, the AS layer entity 100*a* of the UE 100 may, based on the command or auxiliary information (hereinafter, referred to as the "command/auxiliary information") received from the eNB 200, determine necessity of the codec adaptation. The auxiliary information may be trigger information described in the third embodiment and the modifications thereof.

Figure 9:
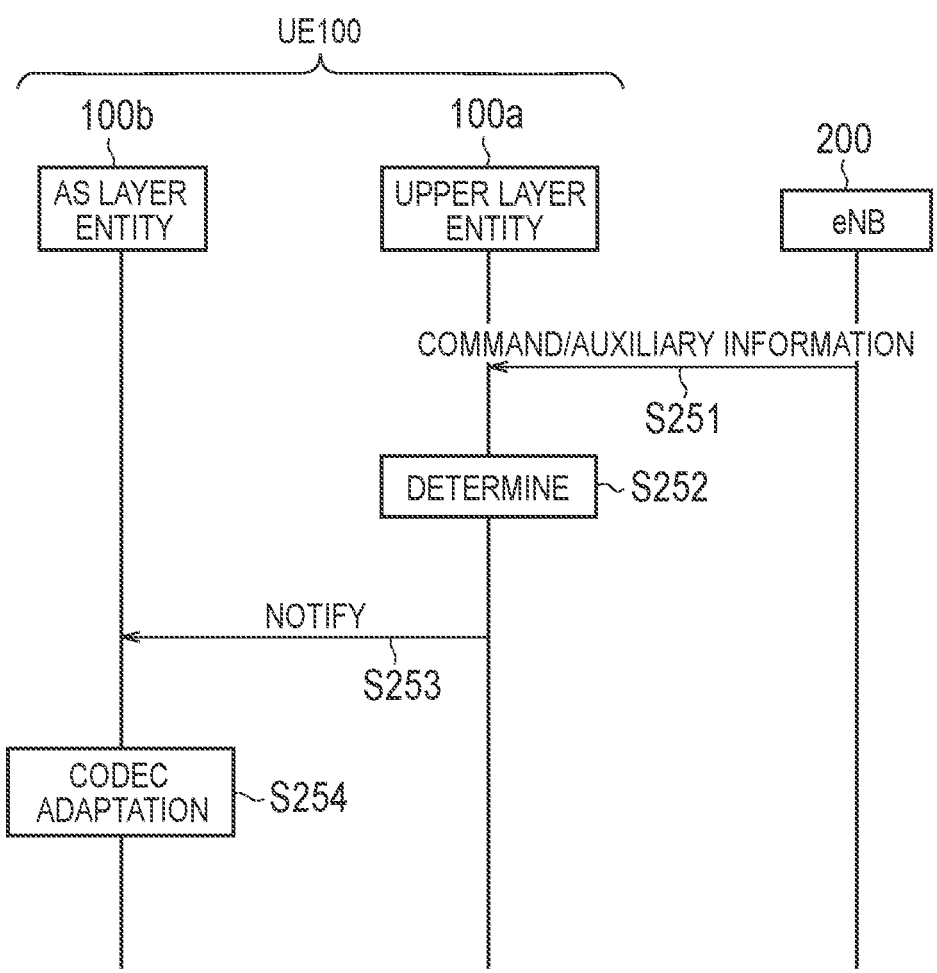
FIG. 9 is a diagram illustrating a modification of the second embodiment.

FIG. 9 is a diagram illustrating a modification of the second embodiment.

The UE 100 is configured to perform a codec adaptation based on assistance or control of an eNB 200. The UE 100 (the controller 130) includes the AS layer entity 100*a* configured to receive AS layer signaling for a codec adaptation from the eNB 200 (step S251), and the upper layer entity 100*b* positioned in an upper layer than the AS layer entity 100*a*, and configured to perform a codec adaptation (step S254). As described above, the AS layer entity 100*a* includes a physical layer, a MAC layer, an RLC layer, a PDCP layer, and an RRC layer. Hereinafter, the AS layer entity 100*a* may be replaced with a physical layer entity, a MAC layer entity, an RLC layer entity, a PDCP layer entity, or an RRC layer entity.

AS layer signaling is command/auxiliary information concerning a codec adaptation. The AS layer signaling may be, for example, SIB (that is, broadcast signaling). In this case, the command/auxiliary information is used for each cell. Alternatively, the AS layer signaling may be UE-dedicated signaling, or may be (SC-) MCCH. In the case of UE-dedicated signaling, the command/auxiliary information may include a list of DRBs for which a codec adaptation is to be performed.

The AS layer entity 100*a* determines a necessity of the codec adaptation based on the AS layer signaling (step S253), and provides a notification indicating the necessity to an upper layer entity (step S254). The AS layer entity 100*a*, only if a codec adaptation is determined to be necessary, provides a notification to the upper layer entity. In other words, the AS layer entity 100*a*, if a codec adaptation is determined to be unnecessary, does not provide a notification to an upper layer entity.

The notification may simply be a notification indicating the necessity of the codec adaptation (for example, "codec-adaptation-needed").

Alternatively, the notification may include information concerning a codec parameter. The codec parameter includes at least one of a codec mode, a codec rate, and a radio bit rate. The notification may contain an identifier of the DRB for which the codec adaptation is to be performed.

A specific example of the information contained in the notification will be described below.

Firstly, the information contained in the notification may be information indicating an increase or decrease of the codec rate. For example, the AS layer entity 100*a* notifies the upper layer entity 100*b* of a relative rate to the current codec rate, such as "codec-rate-up" or "codec rate-down".

Secondly, the information contained in the notification may be information indicating an increase or decrease of the rate, which may also include a change in the codec mode. For example, the AS layer entity 100*a* notifies the upper layer entity 100*b* of information for requesting a change in the code mode and/or the codec rate, such as "codec-up-request" or "codec-down-request".

Thirdly, the information contained in the notification may be information indicating a change (reselection) in the codec mode. For example, the AS layer entity 100*a* notifies the upper layer entity 100*b* of information for requesting a change in the code mode, such as "codec-mode-change-request".

Fourthly, the information contained in the notification may be the (minimum guaranteed) bit rate notified from the eNB 200. For example, the AS layer entity 100*a* notifies the upper layer entity 100*b* of information indicating the (minimum guaranteed) bit rate notified from the eNB 200, such as "xxx-bps-guaranteed". It is noted that the information contained in the notification may be quantized, and the AS layer entity 100*a* may notify the upper layer entity 100*b* of an index value. Specifically, a mapping table showing a correspondence relationship between a direct value and an index value is defined beforehand, and the AS layer entity 100*a* and the upper layer entity 100*b* perform conversion between a direct value and an index value by using the mapping table. For example, the index value is defined as "00"=200 kbps, "01"=400 kbps . . . .

It is noted that although a notification from the AS layer entity 100*a* to the upper layer entity 100*b* was described above, a notification from the upper layer entity 100*b* to the AS layer entity 100*a* may also be performed. Such a notification can also be applied to embodiments other than the second embodiment. For example, the upper layer entity 100*b*, if a codec adaptation is completed, may notify the AS layer entity 100*a* of the completion. In other words, the AS layer entity 100*a* may receive a notification, from the upper layer entity 100*b*, indicating that the codec adaptation is completed. The notification may be transferred to the eNB 200 by using AS layer signaling. Alternatively, a predetermined operation using the AS layer signaling may be triggered. An example of the predetermined operation includes a BSR. It is noted that if the codec adaptation could not be completed successfully, the AS layer entity 100*a* may not receive a notification from the upper layer entity 100*b*, or the AS layer entity 100*a* may receive a notification, from the upper layer entity 100*b*, indicating that the codec adaptation could not be completed successfully.

Third Embodiment

A third embodiment will be described while focusing on differences from the first and second embodiments below.

The UE 100 according to the third embodiment receives, from the eNB 200, trigger information for causing the UE 100 to execute a codec adaptation through AS layer signaling. The trigger information may include information indicating whether the codec rate should be increased or should be decreased.

The AS layer signaling is, for example, SIB (broadcast signaling). In this case, the trigger information is used for each cell. Alternatively, the AS layer signaling may be UE-dedicated signaling, or may be (SC-) MCCH. In the case of UE-dedicated signaling, the trigger information may include a list of DRBs for which the codec adaptation is to be performed.

The UE 100 performs the codec adaptation in response to the reception of the trigger information. Specifically, the AS layer entity 100*a* of the UE 100 transfers the trigger information received through the AS layer signaling to the upper layer entity 100*b*. The upper layer entity 100*b* of the UE 100 performs the codec adaptation according to the trigger information transferred from the AS layer entity 100*a*.

Further, if the eNB 200 repeatedly transmits the trigger information and the UE 100 repeatedly receives the trigger information, the UE 100 may not preferably apply all the trigger information.

Thus, the trigger information may include tag information (a value tag) for determining an update of the trigger information. The eNB 200 may update (count up) the tag information upon updating contents of the trigger information. The UE 100 may, when the tag information is updated, apply the trigger information. Specifically, the AS layer entity 100*a* of the UE 100, only if the trigger information received previously and the tag information received this time are different, applies the tag information received this time (that is, transfers the information to the upper layer entity 100*b*).

Alternatively, the trigger information may include timer information for defining a period during which application of the trigger information is prohibited (a prohibition period). The AS layer entity 100*a* of the UE 100, upon a piece of trigger information being applied, starts the timer for counting the prohibition period. The AS layer entity 100*a* of the UE 100 does not apply the trigger information received during the prohibition period (that is, does not transfer the information to the upper layer entity 100*b*). Also, the AS layer entity 100*a* applies the trigger information received after the expiry of the prohibition period (the timer) (that is, transfers the information to the upper layer entity 100*b*).

Modification of Third Embodiment

A modification of the third embodiment will be described while focusing on differences from the third embodiment below.

Figure 10:
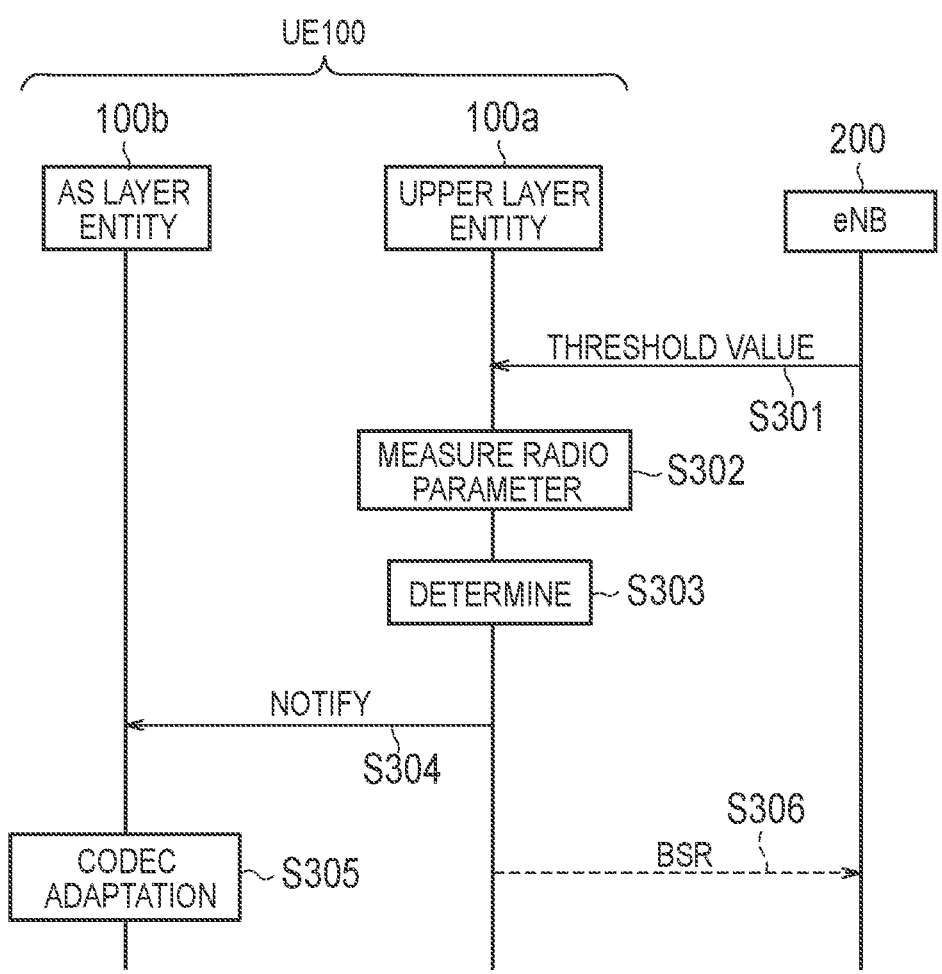
FIG. 10 is a diagram illustrating a modification of a third embodiment.

FIG. 10 is a diagram illustrating a modification of the third embodiment.

In the modification of the third embodiment, the trigger information includes a threshold value of a radio quality parameter. The trigger information may be a type of auxiliary information. As illustrated in FIG. 10, the AS layer entity 100*a* of the UE 100 receives trigger information including a threshold value from the eNB 200 (step S301).

The radio quality parameter is a parameter indicating the quality of the radio communication between the UE 100 and the eNB 200. The radio quality parameter is at least one of RSRP (Reference Signal Received Power), RSRQ (Reference Signal Received Quality), RS-SINR (Reference Signal-Signal-to-Interference plus Noise power Ratio), a bit rate, an error rate, or the number of times of re-transmissions in HARQ or RLC. if the radio quality parameter is a bit rate, the threshold value of the bit rate may be the maximum permissible bit rate and/or the minimum guaranteed bit rate.

The AS layer entity 100*a* of the UE 100 measures the radio quality parameter (step S302), and determines whether or not the measured radio quality parameter satisfies the threshold value (step S303). In response to the measured radio quality parameter satisfying the threshold value, the AS layer entity 100*a* provides, to the upper layer entity 100*b*, a notification indicating a necessity of the codec adaptation (step S304). In response to the notification, the upper layer entity 100*b* performs a codec adaptation (step S305).

It is noted that the "measured radio quality parameter satisfies the threshold value" means that a value of the measured radio quality parameter reaches the threshold value. For example, if the trigger information includes a threshold value of RSRP, in response to the measured RSRP having reached the threshold value of RSRP (for example, the UE 100 the measured RSRP has fallen below the threshold value), performs a codec adaptation. For example, the AS layer entity 100*a* may notify the upper layer entity 100*b* of a command to reduce the codec rate if the RSRP falls below the threshold value. Alternatively, the AS layer entity 100*a* may notify the upper layer entity 100*b* of a command to increase the codec rate if the RSRP exceeds the threshold value. Further, in this way, a plurality of threshold values may be set to the same radio quality parameter (for example, RSRP), or information concerning types of codec adaptation (including a type of the adaptation for increasing or decreasing the rate, for example) may be linked to each of the threshold values.

In the modification of the third embodiment, in response to the measured radio quality parameter satisfying the threshold value, the AS layer entity 100*a* of the UE 100 may transmit, to the eNB 200, a buffer status report (BSR) indicating the data amount of the uplink buffer (step S306). In other words, the AS layer entity 100*a*, if any of the threshold values described above are satisfied, triggers a BSR. Alternatively, the AS layer entity 100*a* triggers a BSR in response to any of the threshold values described above being satisfied, or a command or notification to perform a codec adaptation is provided to the upper layer entity 100*b*. Alternatively, the AS layer entity 100*a*, triggers a BSR in response to any of the threshold values described above being satisfied, or the upper layer entity 100*b* is completed a codec adaptation. The eNB 200 can presume depending on a value of the BSR whether or not a codec adaptation (that is, a change in the codec mode and/or the codec rate) has been executed (or the rate after the adaptation).

Here, an example of an operation according to the modification of the third embodiment will be described. After a threshold value is set to the UE 100, the UE 100, for example, receives an interference from an adjacent cell, due to which the error rate deteriorates and retransmission increases. In response to the number of times of re-transmissions having reached the threshold value, the UE 100 determines that a codec adaptation is necessary, and reduces the codec rate. The UE 100 transmits a BSR to the eNB 200, and the eNB 200 presumes from the BSR that the codec rate has been changed. In this case, eNB 200 adjusts (reduces) the MCS, and/or performs additional resource allocation.

Fourth Embodiment

A fourth embodiment will be described while focusing on differences from the first to third embodiments below.

In the embodiment described above, the UE 100 performs a codec adaptation based on assistance or control by the eNB 200. The assistance or control by the eNB 200 is provided to the UE 100 through AS layer signaling. Here, the codec adaptation includes at least one of adaptation of the codec mode and adaptation of the codec rate.

However, the UE 100 may perform one of adaptation of the codec mode and adaptation of the codec rate without being based on the assistance or the control of the eNB 200. Th UE 100 can autonomously decide one of adaptation of the codec mode and adaptation of the codec rate in accordance with the status of the UE 100.

The UE 100 according to the fourth embodiment selects one of the codec mode and the codec rate to be applied to the UE 100 by a first selection method, and selects the other by a second selection method.

The first selection method is not related to the assistance or control by the eNB 200. In the first selection method, the upper layer entity 100*b* of the UE 100 performs the codec adaptation independently of the AS layer entity 100*a*.

In contrast, the second selection method is in accordance with the assistance or control by the eNB 200. In the second selection method, the upper layer entity 100*b* of the UE 100 performs the codec adaptation in association with the AS layer entity 100*a*.

In an operation pattern 1 of the fourth embodiment, the UE 100 selects a codec mode by the first selection method. The UE 100, after selecting the codec mode, selects a codec rate by the second selection method. That is, in the operation pattern, the assistance or the control of the eNB 200 is applied only to the adaptation of the codec rate in the codec adaptation.

Figure 11:
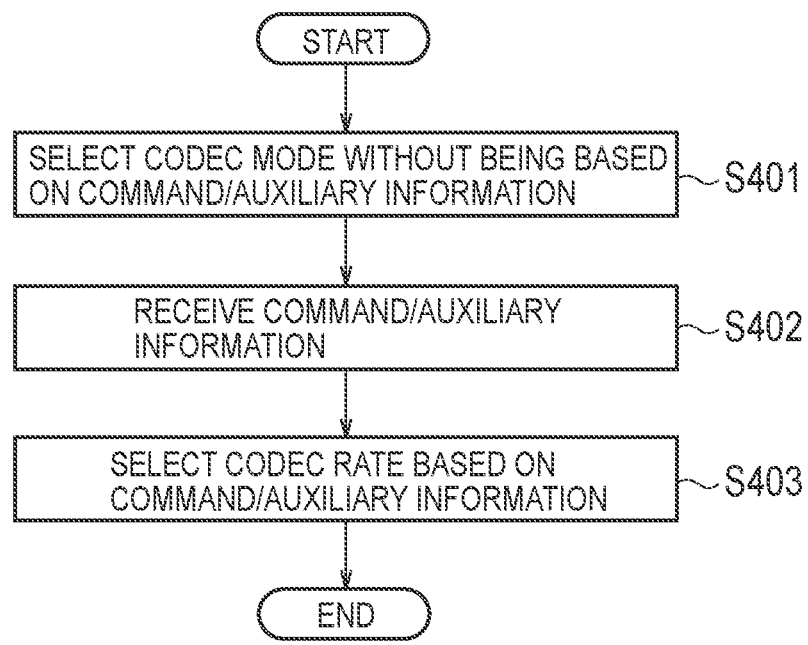
FIG. 11 is a diagram illustrating an operation pattern 1 of a fourth embodiment.

FIG. 11 is a diagram illustrating the operation pattern 1 of the fourth embodiment. As illustrated in FIG. 11, in step S401, the upper layer entity 100*b* of the UE 100 selects an optimal codec mode without being based on the command/auxiliary information (the AS layer signaling). In step S402, the AS layer entity 100*a* of the UE 100 receives the command/auxiliary information from the eNB 200. In step S403, the upper layer entity 100*b* or the AS layer entity 100*a* of the UE 100 selects an optimal codec rate based on the command/auxiliary information.

In an operation pattern 2 of the fourth embodiment, the UE 100 selects a codec mode by the second selection method. The UE 100, after selecting the codec mode, selects a codec rate by the first selection method. That is, in the operation pattern, the assistance or the control of the eNB 200 is applied only to the adaptation of the codec mode in the codec adaptation.

Figure 12:
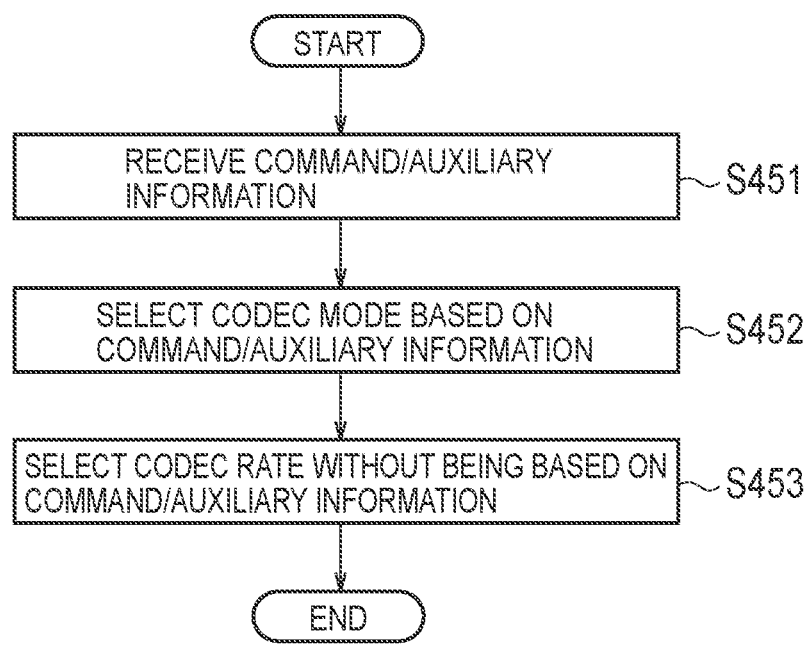
FIG. 12 is a diagram illustrating an operation pattern 2 of the fourth embodiment.

FIG. 12 is a diagram illustrating an operation pattern 2 of the fourth embodiment. As illustrated in FIG. 12, in step S451, the AS layer entity 100*a* of the UE 100 receives the command/auxiliary information (the AS layer signaling) from the eNB 200. In step S452, the upper layer entity 100*b* or the AS layer entity 100*a* of the UE 100 selects an optimal codec mode based on the command/auxiliary information. In step S453, the upper layer entity 100*b* of the UE 100 selects an optimal codec rate without being based on the command/auxiliary information.

It is noted that in the second selection method, the AS layer signaling according to the embodiments described above is used in the assistance or control by the eNB 200. Alternatively, as the assistance or control by the eNB 200, information indicating the load level of the eNB 200 may be provided to the UE 100 through the AS layer signaling. In this case, the UE 100, in the second selection method, receives, from the eNB 200, load information indicating the load level of the eNB 200, and performs the codec adaptation based on the load information. The load information may be information indicating the utilization of the radio resources of the eNB 200, the congestion level of backhaul of the eNB 200, the utilization of hardware (CPU, memory) of the eNB 200, and the like. Alternatively, the load information may be information indicating that congestion has occurred in the eNB 200. The UE 100 selects the codec mode or the codec rate based on the load information.

Fifth Embodiment

A fifth embodiment will be described while focusing on differences from the first to fourth embodiments below.

In the embodiments described above, the UE 100 having received a command from the eNB 200 is primarily assumed to perform a codec adaptation according to the command. However, due to circumstances that cannot be known by the eNB 200, a codec adaptation in accordance with the command may be difficult. An example of such a case may include a case where a failure occurs in a specific communication interval that is different from a radio link between the UE 100 and the eNB 200. The specific communication interval includes a core network, the Internet, or a radio link of a communication partner of the UE 100. For example, if a failure occurs in a router of a core network, it may be difficult to increase the codec rate.

The UE 100 according to the fifth embodiment receives a command concerning the codec adaptation from the eNB 200, and performs the codec adaptation based on the command. The UE 100 determines whether or not the command can be applied. The UE 100 disables the command, in response to the determination that the command cannot be applied. In other words, the UE 100 either overwrites or ignores the command, in response to the determination that the command cannot be applied.

The UE 100 may transmit, to the eNB 200, a notification concerning disabling of the command, in response to disabling of the command. Further, the notification may include a codec parameter that the UE 100 desires. The codec parameter includes at least one of a codec mode, a codec rate, and a radio bit rate. The eNB 200 may, based on the notification from the UE 100, determine a change in the codec mode and/or the codec rate, and transmit a new command to the UE 100.

FIG. 13 is a diagram illustrating an example of an operation sequence according to the fifth embodiment.

As illustrated in FIG. 13, in step S501, the AS layer entity 100a of the UE 100 receives a command from the eNB 200. In step S502, the AS layer entity 100a transfers the command to the upper layer entity 100b.

In step S503, the upper layer entity 100b may perform the codec adaptation according to the command. In step S504, the upper layer entity 100b determines whether or not the command can be applied. If the codec adaptation has already been performed according to the command, the upper layer entity 100b may determine whether or not the command can be continuously applied. For example, the upper layer entity 100b may determine whether or not a failure has occurred in a specific communication interval that is different from a radio link between the UE 100 and the eNB 200. Here, the description will be proceeded with assuming that the upper layer entity 100b has determined that the command cannot be applied.

In step S505, the upper layer entity 100b provides a notification concerning disabling of the command to the AS layer entity 100a. As described above, the notification may include a codec parameter that the upper layer entity 100b desires. In step S506, the upper layer entity 100b and the AS layer entity 100a disable the command. In step S507, the AS layer entity 100a transmits the notification provided from the upper layer entity 100b to the eNB 200.

Other Embodiments

In the embodiments described above, it is assumed that one-to-one communication is performed between the UE 100 and the communication partner of the UE 100. However, the UE 100 may perform broadcast or multicast communication (for example, MBMS or SC-PTM). In this case, the communication partner of the UE 100 may be an application server (such as a GCS AS).

In the embodiments described above, a codec adaptation for voice data was mainly described. However, instead of voice data, or in addition to the voice data, a codec adaptation may be performed for video data. For example, a codec adaptation may be performed for real-time applications such as video streaming.

In the embodiments described above, the UE capability information (UE capability) notified by the UE 100 to the network was not specifically mentioned. However, the UE 100 may notify the eNB 200 or the MME 300 of any one or more of the support possibility and/or the type of the codec adaptation function, the type of the codec mode to be supported, and the type of the codec rate to be supported as the UE capability information. As a result of the notification, the eNB 200 can set and notify the (minimum guaranteed) bit rate described in the first embodiment more appropriately. For example, the eNB 200 can notify a bit rate in which a margin is added to the codec rate. Further, the UE 100 may, based on the codec mode/rate that the UE 100 supports, notify the eNB 200 of a variable width (that is, the maximum value and/or the minimum value of the radio bit rate) of the bit rate. As a result of the notification, based on the radio environment of the UE 100 and the information about the variable width, etc., the eNB 200 can appropriately adjust the radio bit rate (perform the radio resource scheduling, for example).

The present disclosure is not limited only to a case where the embodiments described above may be implemented independently; but two or more embodiments may be combined and implemented. For example, a part of the configuration according to one embodiment may be added to another embodiment. Alternatively, the part of the configuration according to one embodiment may be replaced by a part of the configuration of another embodiment.

In the embodiments described above, the LTE system was exemplified as the mobile communication system. However, the present disclosure is not limited to the LTE system. The present disclosure may be applied to systems other than the LTE system.

(Supplementary Note 1)
(Introduction)

One of the main objectives is to consider potential RAN enhancements that would provide a flexible and efficient codec modification mechanism under more dynamic radio conditions. This supplementary note discusses the issues that should be addressed from the RAN perspective.

(Ran Considerations)

One of the objectives of the SI is to investigate mechanisms that are applicable to different codec types including AMR, EVS and video in both downlink and uplink to enable the following:

Codec mode and rate selection at call setup.
Codec rate adaptation during an on-going call.
Coder adaptation can be triggered cell-wide or on a per-UE or per DRB basis.
Up/down-side tuning of codec rate.

So far with ECN, based on the previous study, it was concluded that since all voice codecs and video codec can adapt to a reduced data rate as needed so there is no requirement for codec selection based on network loading conditions during call setup and on-going call. However, since HD voice quality strongly relies on the radio transmission reliability, and radio conditions can change more rapidly than changing load conditions, it should be further studied whether it is necessary to have further assistance from the UE or eNB to trigger the need for codec rate adaptation. It should also be considered to what extent the eNB should be involved in the codec rate adaptation, whether the eNB should have direct control over the codec adaptation or if the eNB is only involved in the triggering of the codec rate adaptation based on RAN conditions.

Proposal 1: It should study both eNB-assisted Codec Adaptation and eNB-controlled Codec Adaptation approaches for vocorder rate adaptation at call setup and on-going.

Assuming the eNB-assisted or eNB-controlled codec adaptation is needed at call setup, it would be necessary for the eNB to obtain the UE's radio condition during call setup assuming the UE is in IDLE prior to call setup. However, the existing RRC procedure does not have a means for the eNB to estimate the DL radio condition prior to call setup. Therefore, it is necessary for the eNB to have a standardized means for obtaining the UE's radio condition.

Proposal 2: To support codec adaptation at call setup, it should study how eNB obtains the UE's DL radio conditions prior to call setup.

Assuming the eNB will at least provide some assistance for the UE to facilitate more effective negotiation of Codec Adaptation, it can be expected that the eNB has the flexibility to provide the necessary MCS, amount of resources blocks (e.g., SPS configuration) and the GBR for a particular DRB, at least based on the radio conditions but it may also be based on the information on the initial codec adaptation rate if this is observable at the eNB. Otherwise, the eNB may assume a more conservative approach for the initial radio parameters. This may be provided as part of RRC Connection Reconfiguration.

Proposal 3: It should study how eNB provide the necessary MCS, resources and GBR for specific DRBs after call setup in RRC Connection.

As indicated in Proposals 1 and 3, the level of assistance from the eNB will be highly dependent on the eNB's knowledge of codec adaptation, which has remained only in the application layer in the past. If RAN2 continues with the principle that the eNB should not be aware of codec selection and adaptation, then it may be necessary to coordinate with SA4 and IETF to define a new IP header format to indicate other RAN factors that may affect the codec rate negotiation or to accept the possibility of dropped packets.

Proposal 4: It should study if eNB-assisted ECN will be a candidate for the eNB-assisted approaches.

Although the ECN-based solution has the benefit of being independent of the specific codec selected now or in the future, the eNB cannot directly influence the codec rate. One of the downside of this lack of direct control of the codec rate is the latency for the client terminals to negotiate to an acceptable rate even if we can assume that all the network entities can support ECN. The ECN-based mechanism may be affective if only congestion control should be taken into account. But for more dynamic changes such as radio conditions, the eNB should be allowed to have a more direct control the rate adaptation.

Proposal 5: It should study if eNB-controlled direct rate adaptation will be a candidate of eNB-controlled approaches.

(Supplementary Note 2)
(1. Introduction)

One of the main objectives is to consider potential RAN enhancements that would provide a flexible and efficient codec modification mechanism under more dynamic radio conditions. This supplementary note discusses the viable solutions for RAN-based codec rate adaptation.

(2. Initial Considerations)

The following understanding for RAN based solution was agreed:

Agreements: Capture the following as the principles of the feasible candidate solutions of codec selection/adaptation 1. Any rate adaptation mechanism introduced by RAN can co-exist with the rate-adaptation mechanisms specified in TS 26.114.
2. Any rate adaptation mechanism introduced by RAN should explicitly indicate the recommended bit rate.
3. Avoid excessive ping-pong tuning For further study: Any rate adaptation mechanism introduced by RAN shall be codec type agnostic In addition to the above baseline assumptions for potential RAN based solution, it is necessary to decide how the RAN interacts with the UE and which entity is ultimately responsible for codec rate decisions. The need for codec rate adaptation during call setup is also considered.

(2.1 RAN Controlled Codec Rate Adaptation)

In order to support RAN controlled codec rate adaptation, it should be considered whether the RAN needs to have the information on the specific codec rates for each type of supported codec. Based on the result from the previous meeting, it is concluded that:

For further study: Any rate adaptation mechanism introduced by RAN shall be codec type agnostic If it assumes the RAN has specific information about the codec type, the implication is that the RAN would be aware of the codec rate, the frame aggregation, the redundancy level and the redundancy offset. This would imply the RAN could essentially serve as the end point for codec rate adaptation in place of the UE. Even if such codec related information could potentially be available in the RAN, it would be desirable not to provide codec specific AS layer signalling to the UE as any future codec changes may result in further changes to AS layer signalling. Furthermore, it should consider that one of the major drawbacks to the ECN-based solution as pointed out is that it would be necessary for all the network entities to support ECN for such a solution to work. As concluded previously, ECN solution needs all the nodes on the path to behave correctly.

The same may also be true for codec specific information within the RAN. Such a solution would also require that the RAN has specific codec information for the solution to work.

Proposal 1: As a baseline, the solution for codec rate adaptation should not require that the RAN has codec specific information.

From the perspective of codec rate adjustment, Proposal 1 means the RAN may decide, based on e.g., its congestion condition, whether to request that the UE performs down-switching or upswitching of its codec rates. However, it is conceivable that if RAN has some information about the codec, such as the allowable codec rates, it may lead to more efficient or faster means for adjusting codec rates. Therefore, it should discuss whether there should be an option for the RAN to obtain certain codec specific information, such as the allowable codec rates, from the UE.

Proposal 2: If RAN controlled codec rate adaptation is supported, the RAN may optionally request from the UE the supported codec rates of operation.

As is described in other article, rate adaptation is mainly used to ensure that the used bandwidth is sufficiently low to avoid packet losses and extended delays when operating conditions change. From this perspective, the RAN is in the best position to decide whether sufficient resources may be provided to the UE to prevent any unnecessary interruptions. Therefore, the RAN should be allowed to determine the minimum GBR to the UE. Assuming Proposal 1 is agreeable, it should be considered how the RAN controlled codec adaptation should be realized to meet the minimum GBR. As a baseline and based on what was already agreed at the last meeting the RAN should explicitly indicate the recommended bit rate. And if the RAN has specific codec rates under operation by the UE, the recommended codec rate may match the supported codec rates as suggested in Proposal 2.

Confirmation 1: If RAN controlled codec rate adaptation is supported, the RAN should explicitly indicate the recommended bit rate.

Based on Confirmation 1, It should also consider how the recommended bit rate should be provided to the UE. The typical choices include the use of RRC Connection Reconfiguration, PDCCH or MAC CE. The choices would largely depend on the urgency for changing the codec rates. For example, with RRC Connection Reconfiguration, the RRC processing would usually take 15 ms. There were also a VoLTE latency-related discussion, whereby it was considered whether C-DRX extension from 40 ms to 60 ms would cause significant degradation to voice quality. However, since codec rate changes are not expected to be changed frequently, the RRC processing delay may still offer sufficient improvement over the existing end-to-end codec rate adaptation Proposal 3: If RAN controlled codec rate adaptation is supported, it should further discuss the mechanism by which the codec bit rate is provided to the UE.

Another issue that should be considered as part of the RAN controlled rate adaptation is the likelihood more than one rate adaptation algorithms could be used simultaneously and how the interactions among the rate adaptation algorithms should be handled. When multiple adaptation algorithms are used for the rate adaptation, it is assumed in that the rate that the MTSI client is allowed to use should be no higher than any of the rates determined by each adaptation algorithm. Considering the latency for the existing rate adaptation algorithm, it is likely that the RAN controlled rate adaption may not be effective if the existing rate adaptation mechanism frequently overrides the RAN controlled rate adaptation algorithm.

Proposal 4: If RAN controlled codec rate adaptation is supported, It should further discuss the UE behaviour under parallel codec rate adaptation algorithms.

(2.2 RAN Assisted Codec Rate Adaptation)

In contrast to the RAN controlled codec rate adaptation discussed in section 2.1, the RAN assisted alternative leaves the final control of the rate adaptation to the UE. Such a mechanism, may be similar in principle to the RAN assisted WLAN interworking whereby the RAN conditions for evaluating the need to change the codec rate is provided to the UE and the UE will make the final decision in the upper layer for the necessary rate adjustments. The main advantage for the RAN assisted codec rate adaptation is to allow for minimal impact to the existing codec rate adaptation algorithms. Additionally, the RAN would not need detailed information regarding the specific codec rates which is typically outside of RAN's control. This mechanism would be easily aligned with the following agreement/conclusions from the last meeting:

"Any rate adaptation mechanism introduced by RAN can co-exist with the rate-adaptation mechanisms specified in TS 26.114."

"Confirm that the candidate solutions should be RAN-involved."

The main drawback for the RAN assisted mechanism is the lack of direct control of the specific codec rates and potentially the increased latency to tune to the desired codec rate.

Proposal 5: It should consider if the RAN assisted codec rate adaptation is preferable to the RAN controlled codec rate adaptation.

If Proposal 5 is agreed, it should also consider the assistance information from the RAN that will be necessary take into account of the RAN conditions that are outside of UE's knowledge. Assistance information may include thresholds e.g., signal strength, number of dropped packets, number of HARQ retransmissions whereby the UE is recommended to take actions to either lower or increased the codec rate, in case the UE is not already operating in the targeted/desired codec rate. The thresholds may be configured to the UE via dedicated signalling or broadcast. In some ways, this will have most of the benefit of the ECN solution without requiring all network layers to support ECN, which is one of the main obstacles for the support of the ECN solution.

Proposal 6: If Proposal 5 is agreeable, it should further consider how the RAN provides assistance to the UE for codec rate adaptation and the contents of the assistance.

(2.3 Rate Adaptation During Call Setup)

It has already been identified that one of the objectives of the SI is to investigate mechanisms that are applicable to different codec types including AMR, EVS and video in both downlink and uplink to enable the following:

Codec Mode and Rate Selection at Call Setup

Other article point out that "there is no requirement for voice codec selection based on network loading conditions", what is expected is that the video codec can always start from the lowest codec rate supported and adapt to a higher rate under good conditions. However, as pointed out in other articles, if the UE starts from the lowest codec rate, the up-tuning delay can be excessive and could affect voice quality as there may be periods where the codec needs to be guaranteed operation at higher codec rate to properly encode the source material e.g., weakly correlated signals such as speech onsets/transients are coded at higher bit-rates to preserve audio quality. Considering it has already agreed that any rate adaptation mechanism introduced by RAN should explicitly indicate the recommended bit rate for on-going calls, it should also consider if the same should be applicable to call setup.

Proposal 6: It should consider if codec rate adaptation is should be supported at call setup.

If Proposal 6 is agreeable, it may be assumed that the RAN can consider its congestion situation as part of the codec adaptation. However, other aspects related specifically to the UE such as the radio condition are also needed for the RAN to determine the resources that need to be allocated to the UE to support the intended codec rate.

Proposal 7: It should further consider if the RAN requires UE specific information such as the UE's radio condition to support codec rate adaptation at call setup.

INDUSTRIAL APPLICABILITY

The present disclosure is useful in the field of mobile communication.

The invention claimed is:

1. A method used for a first user equipment (UE) having a codec in which at least one of encoding audio or video data and decoding of the audio or video data is performed, the method comprising:
   acquiring a first bit rate for the codec from a second user equipment that is a communication partner of the first user equipment; and transmitting, a message for checking whether the first bit rate can be provided by a base station, to the base station, wherein the message includes information indicating the first bit rate, and the method further includes transmitting a UE capability information indicating whether the first user equipment supports reception of a MAC CE including a recommended bit rate from the base station, to the base station.

2. A first user equipment (UE) having a codec in which at least one of encoding audio or video data and decoding of the audio or video data is performed, the first user equipment comprising:

a memory and a processor electrically connected to the memory, wherein the processor is configured to execute processes of:

acquiring a first bit rate for the codec from a second user equipment that is a communication partner of the first user equipment; and transmitting, a message for checking whether the first bit rate can be provided by a base station, to the base station, wherein the message includes information indicating the first bit rate, and the processor is configured to execute a process of transmitting a UE capability information indicating whether the first user equipment supports reception of a MAC CE including a recommended bit rate from the base station, to the base station.

3. A chipset for a first user equipment (UE) having a codec in which at least one of encoding audio or video data and decoding of the audio or video data is performed, the chipset comprising:

a memory and a processor electrically connected to the memory, wherein the processor is configured to execute processes of:

acquiring a first bit rate for the codec from a second user equipment that is a communication partner of the first user equipment; and transmitting, a message for checking whether the first bit rate can be provided by a base station, to the base station, wherein the message includes information indicating the first bit rate, and the processor is configured to execute a process of transmitting a UE capability information indicating whether the first user equipment supports reception of a MAC CE including a recommended bit rate from the base station, to the base station.

* * * * *